United States Patent

Ogasawara et al.

(10) Patent No.: US 11,966,104 B2
(45) Date of Patent: Apr. 23, 2024

(54) OPTICAL MODULATOR

(71) Applicant: Sumitomo Electric Industries, Ltd., Osaka (JP)

(72) Inventors: Makoto Ogasawara, Osaka (JP); Naoya Kono, Osaka (JP); Mitsuru Ekawa, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 201 days.

(21) Appl. No.: 17/748,225

(22) Filed: May 19, 2022

(65) Prior Publication Data

US 2022/0390774 A1 Dec. 8, 2022

(30) Foreign Application Priority Data

Jun. 7, 2021 (JP) .................... 2021-095001

(51) Int. Cl.
*G02F 1/025* (2006.01)
*G02F 1/21* (2006.01)
*G02F 1/225* (2006.01)

(52) U.S. Cl.
CPC .............. *G02F 1/025* (2013.01); *G02F 1/212* (2021.01); *G02F 1/2257* (2013.01)

(58) Field of Classification Search
CPC ......... G02F 1/025; G02F 1/2257; G02F 1/212
USPC ....................................................... 385/1–3
See application file for complete search history.

(56) References Cited

U.S. PATENT DOCUMENTS

| | | | |
|---|---|---|---|
| 2016/0380023 A1* | 12/2016 | Yoneda | H01L 31/105 257/432 |
| 2018/0081118 A1* | 3/2018 | Klamkin | H01S 5/1035 |
| 2018/0164654 A1* | 6/2018 | Ogiso | G02F 1/2257 |
| 2019/0317341 A1 | 10/2019 | Nishikawa | |

FOREIGN PATENT DOCUMENTS

WO 2018/131227 A1 7/2018

OTHER PUBLICATIONS

Juan Montoya et al., "Integration of quantum cascade lasers and passive waveguides", Applied Physics Letters 107, Jul. 22, 2015, p. 031110.

(Continued)

*Primary Examiner* — Michelle R Connelly
*Assistant Examiner* — Kirsten D. Endresen
(74) *Attorney, Agent, or Firm* — Volpe Koenig

(57) ABSTRACT

An optical modulator includes a substrate having a main surface including a first area and a second area, an optical modulation portion disposed on the first area, and an optical waveguide portion disposed on the second area. The optical modulation portion includes a first mesa waveguide and an electrode connected to the first mesa waveguide. The first mesa waveguide includes a p-type semiconductor layer, a first core layer, and an n-type semiconductor layer. The optical waveguide portion includes a second mesa waveguide. The second mesa waveguide includes a first cladding layer, a second core layer, and a second cladding layer. The second core layer is optically coupled to the first core layer. The first cladding layer contains a p-type dopant and protons. The second cladding layer contains an n-type dopant.

13 Claims, 10 Drawing Sheets

(56) References Cited

OTHER PUBLICATIONS

Suguru Akiyama et al., "InP-Based Mach-Zehnder Modulator WithCapacitively Loaded Traveling-Wave Electrodes", Journal of Lightwave Technology, vol. 26, No. 5, Mar. 1, 2008,p. 608-p. 615.
Hideki Yagi et al., "InP-Based Monolithically Integrated PhotonicDevices for Digital Coherent Transmission", IEEE Journal Ofselected Topics in Quantum Electronics, vol. 24,No. 1, Jan./Feb. 2018, p. 6100411.

* cited by examiner

OPTICAL MODULATOR

CROSS REFERENCE TO RELATED APPLICATIONS

This application claims priority based on Japanese Patent Application No. 2021-095001 filed on Jun. 7, 2021, and the entire contents of the Japanese patent application are incorporated herein by reference.

TECHNICAL FIELD

The present disclosure relates to an optical modulator.

BACKGROUND

International Unexamined Patent Publication No. 2018/131227 discloses an optical modulator including a phase modulator of Mach-Zehnder interferometer type and an optical multi/demultiplexer circuit of multimode interference type.

SUMMARY

An optical modulator according to an aspect of the present disclosure includes a substrate having a main surface including a first area and a second area, an optical modulation portion disposed on the first area, and an optical waveguide portion disposed on the second area. The optical modulation portion includes a first mesa waveguide and an electrode connected to the first mesa waveguide. The first mesa waveguide includes a p-type semiconductor layer disposed on or above the substrate, a first core layer disposed on the p-type semiconductor layer, and an n-type semiconductor layer disposed on the first core layer. The optical waveguide portion includes a second mesa waveguide. The second mesa waveguide includes a first cladding layer disposed on or above the substrate, a second core layer disposed on the first cladding layer, and a second cladding layer disposed on the second core layer. The second core layer is optically coupled to the first core layer. The first cladding layer contains a p-type dopant and protons. The second cladding layer contains an n-type dopant.

BRIEF DESCRIPTION OF THE DRAWINGS

The foregoing and other purposes, aspects and advantages will be better understood from the following detailed description with reference to the drawings.

DETAILED DESCRIPTION

Figure 1:
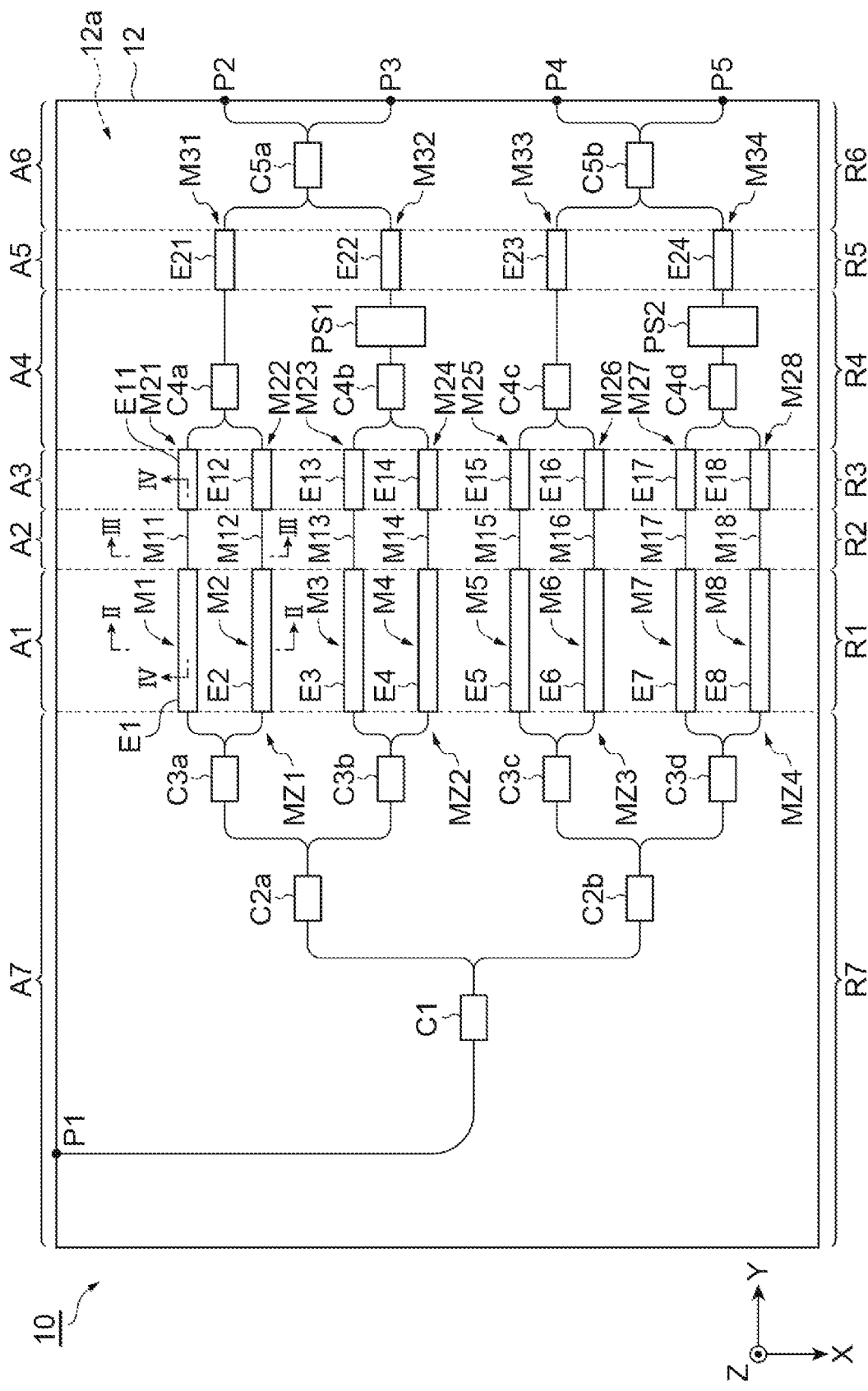
FIG. 1 is a plan view schematically illustrating an optical modulator according to an embodiment.

A Mach-Zehnder modulator comprises two mesa waveguides provided on a semi-insulating substrate. Each mesa waveguide has a so-called pin structure. That is, each mesa waveguide includes an n-type semiconductor layer, an i-type semiconductor layer, and a p-type semiconductor layer sequentially provided on the semi-insulating substrate.

In the mesa waveguide having the pin structure, the n-type semiconductor layer of one mesa waveguide and the n-type semiconductor layer of the other mesa waveguide are electrically connected to each other via a conductive layer. On the other hand, since the p-type semiconductor layer is located at the top of the mesa waveguide, it is difficult to reduce the resistance value of the p-type semiconductor layer by widening the p-type semiconductor layer. Further, a resistivity of a semiconductor material constituting the p-type semiconductor layer is usually higher than that of a semiconductor material constituting the n-type semiconductor layer. Therefore, it is difficult to reduce the resistance value of the mesa waveguide having the pin structure.

Therefore, it is conceivable to use a mesa waveguide having a nip structure instead of the mesa waveguide having the pin structure. The mesa waveguide having the nip structure includes a p-type semiconductor layer, an i-type semiconductor layer, and an n-type semiconductor layer sequentially provided on a semi-insulating substrate. In order to reduce the resistance value of the p-type semiconductor layer, it is conceivable to increase a dopant concentration of the p-type semiconductor layer. However, in this case, an optical absorption coefficient of the p-type semiconductor layer increases.

An optical waveguide portion, which is a passive region, is optically coupled to the Mach-Zehnder modulator. The optical waveguide portion includes a mesa waveguide having the same configuration as the mesa waveguide of the Mach-Zehnder modulator. In the optical waveguide portion, there is a possibility that light leaks from the i-type semiconductor layer serving as the core layer to the p-type semiconductor layer serving as the lower cladding layer. As a result, when the optical absorption coefficient of the p-type semiconductor layer is large, a propagation loss of light propagating through the core layer may increase.

The present disclosure provides an optical modulator capable of reducing a propagation loss of light propagating through a core layer in an optical waveguide portion.

DESCRIPTION OF EMBODIMENTS OF THE PRESENT DISCLOSURE

An optical modulator according to one embodiment includes a substrate having a main surface including a first area and a second area, an optical modulation portion disposed on the first area, and an optical waveguide portion disposed on the second area. The optical modulation portion includes a first mesa waveguide and an electrode connected to the first mesa waveguide. The first mesa waveguide includes a p-type semiconductor layer disposed on or above the substrate, a first core layer disposed on the p-type semiconductor layer, and an n-type semiconductor layer disposed on the first core layer. The optical waveguide portion includes a second mesa waveguide. The second mesa waveguide includes a first cladding layer disposed on or above the substrate, a second core layer disposed on the first cladding layer, and a second cladding layer disposed on the second core layer. The second core layer is optically coupled to the first core layer. The first cladding layer contains a p-type dopant and protons. The second cladding layer contains an n-type dopant.

According to the above-described optical modulator, a carrier trap level is generated by a defect generated in the first cladding layer by a proton implantation. As a result, free carrier absorption or intersubband absorption in the first cladding layer is reduced, so that absorption of light by the first cladding layer can be suppressed. Therefore, the propagation loss of light propagating through the second core layer in the optical waveguide portion can be reduced.

The first cladding layer may have a maximum proton concentration higher than a maximum p-type dopant concentration of the first cladding layer. In this case, absorption of light by the first cladding layer can be further suppressed.

The first cladding layer may have a maximum proton concentration higher than a maximum proton concentration of the second core layer. In this case, the proton concentration of the second core layer can be reduced. Therefore, the conductivity type of the second core layer can be prevented from becoming n-type.

The first cladding layer may have a maximum proton concentration higher than a maximum proton concentration of the second cladding layer. In this case, the proton concentration of the second cladding layer can be reduced. Therefore, the conductivity type of the second cladding layer can be prevented from becoming i-type.

Details of Embodiments of the Present Disclosure

Hereinafter, embodiments of the present disclosure will be described in detail with reference to the accompanying drawings. In the description of the drawings, the same reference numerals are used for the same or equivalent elements, and redundant descriptions are omitted. In the drawings, an X-axis direction, a Y-axis direction, and a Z-axis direction intersecting with each other are shown as necessary. The X-axis direction, the Y-axis direction, and the Z-axis direction are orthogonal to each other, for example.

Figure 2:
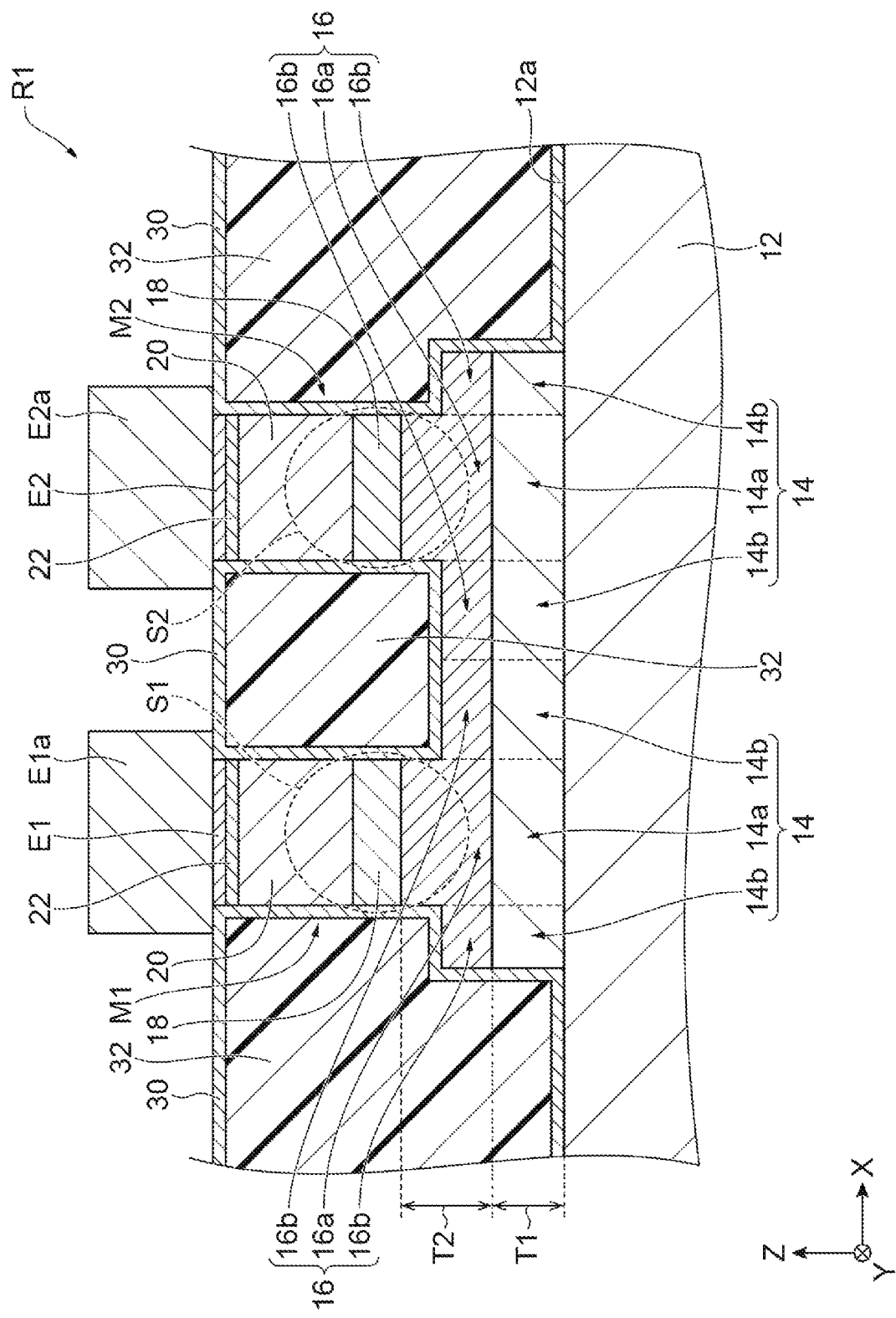
FIG. 2 is a cross-sectional view taken along line II-II of FIG. 1.
Figure 3:
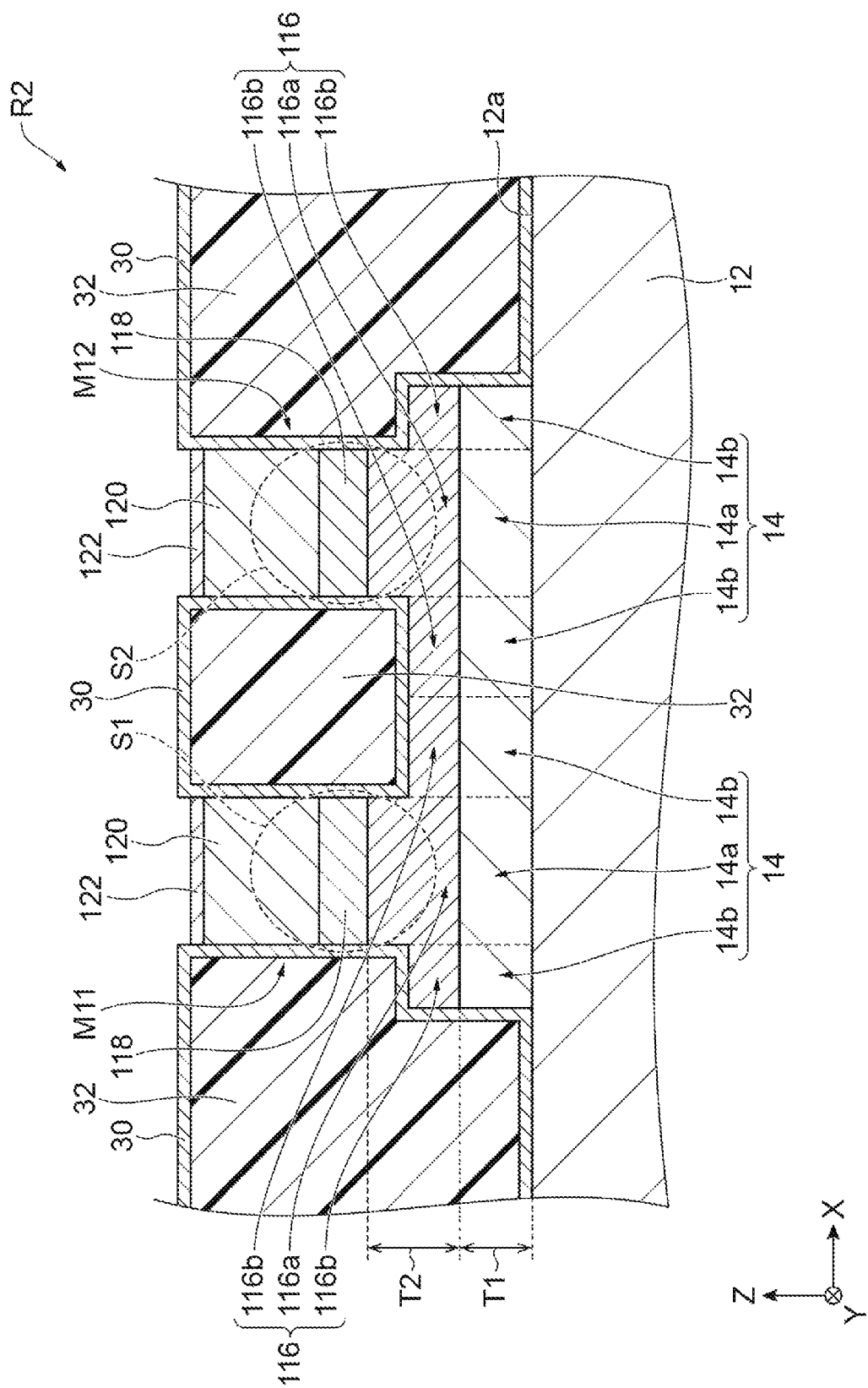
FIG. 3 is a cross-sectional view taken along line of FIG. 1.
Figure 4:
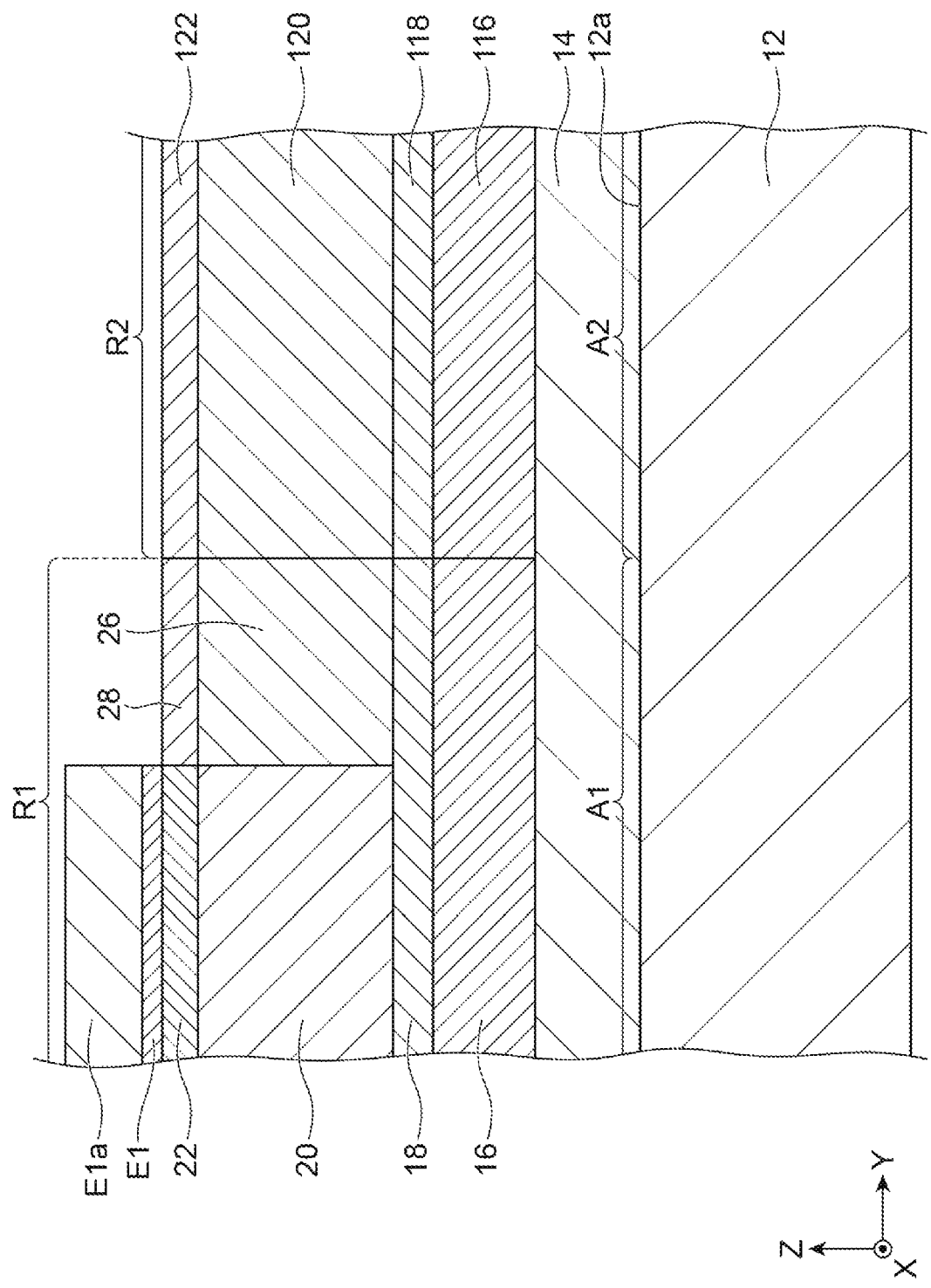
FIG. 4 is a cross-sectional view taken along line IV-IV of FIG. 1.

FIG. 1 is a plan view schematically illustrating an optical modulator according to an embodiment. FIG. 2 is a cross-sectional view taken along line II-II of FIG. 1. FIG. 3 is a cross-sectional view taken along line of FIG. 1. FIG. 4 is a cross-sectional view taken along line IV-IV of FIG. 1. An optical modulator 10 illustrated in FIG. 1 is, for example, an in-phase quadrature (IQ) modulator. Optical modulator 10 includes a substrate 12 having a main surface 12a crossing the Z-axis direction. Main surface 12a includes a first area A1 and a second area A2. Second area A2 may be disposed adjacent to first area A1. Main surface 12a may further include a third area A3, a fourth area A4, a fifth area A5, a sixth area A6, and a seventh area A7. Seventh area A7, first area A1, second area A2, third area A3, fourth area A4, fifth area A5, and sixth area A6 are arranged adjacent to each other in order in the Y-axis direction. Each area has, for example, a rectangular shape.

Optical modulator 10 includes an optical modulation portion R1 provided on first area A1 and an optical waveguide portion R2 provided on second area A2. Optical modulator 10 may further include optical modulation portions R3, R5 and optical waveguide portions R4, R6, R7. Optical modulation portions R1, R3, R5 may be active regions including electrodes. Optical waveguide portions R2, R4, R6, and R7 may be passive regions that do not include electrodes. Optical modulation portion R3 is provided on third area A3. Optical waveguide portion R4 is provided on fourth area A4. Optical modulation portion R5 is provided on fifth area A5. Optical waveguide portion R6 is provided on sixth area A6. Optical waveguide portion R7 is provided on seventh area A7.

Optical waveguide portion R7 has an input port P1 to which light is input. Input port P1 is located at an edge of substrate 12. Optical waveguide portion R7 includes optical demultiplexers C1, C2a, C2b, C3a, C3b, C3c, and C3d. Each optical demultiplexer is a multi-mode interference (MMI) coupler such as a 1×2 multi-mode interference coupler. An input terminal of optical demultiplexer C1 is connected to input port P1 by a mesa waveguide. A first output terminal and a second output terminal of optical demultiplexer C1 are respectively connected to input terminals of optical demultiplexer C2a and optical demultiplexer C2b by mesa waveguides. A first output terminal and a second output terminal of optical demultiplexer C2a are respectively connected to input terminals of optical demultiplexer C3a and optical demultiplexer C3b by mesa waveguides. A first output terminal and a second output terminal of optical demultiplexer C2b are respectively connected to input terminals of optical demultiplexer C3c and optical demultiplexer C3d by mesa waveguides.

Optical modulation portion R1 may include a plurality of Mach-Zehnder modulators MZ1, MZ2, MZ3, and MZ4. Mach-Zehnder modulators MZ1, MZ2, MZ3, and MZ4 are arranged in order in the X-axis direction. Mach-Zehnder modulator MZ1 includes mesa waveguides M1 and M2 (first mesa waveguides) extending in the Y-axis direction. Mach-Zehnder modulator MZ2 includes mesa waveguides M3 and M4 extending in the Y-axis direction. Mach-Zehnder modulator MZ3 includes mesa waveguides M5 and M6 extending in the Y-axis direction. Mach-Zehnder modulator MZ4 includes mesa waveguides M7 and M8 extending in the Y-axis direction. Each of mesa waveguides M1 to M8 functions as an arm waveguide.

A first output terminal and a second output terminal of optical demultiplexer C3a are connected to input terminals of mesa waveguides M1 and M2, respectively. A first output terminal and a second output terminal of optical demultiplexer C3b are connected to input terminals of mesa waveguides M3 and M4, respectively. A first output terminal and a second output terminal of optical demultiplexer C3c are connected to input terminals of mesa waveguides M5 and M6, respectively. A first output terminal and a second output terminal of optical demultiplexer C3d are connected to input terminals of mesa waveguides M7 and M8, respectively.

Mach-Zehnder modulator MZ1 includes electrodes E1 and E2. Electrodes E1 and E2 are connected to mesa waveguides M1 and M2, respectively. As shown in FIG. 2, for example, a wiring E1a and a wiring E2a are connected to electrodes E1 and E2, respectively. Mach-Zehnder modulator MZ2 includes electrodes E3 and E4. Electrodes E3 and E4 are connected to mesa waveguides M3 and M4, respectively. Mach-Zehnder modulator MZ3 includes electrodes E5 and E6. Electrodes E5 and E6 are connected to mesa waveguides M5 and M6, respectively. Mach-Zehnder modulator MZ4 includes electrodes E7 and E8. Electrodes E7 and E8 are connected to mesa waveguides M7 and M8, respectively. A wiring is connected to each of electrodes E3 to E8.

Optical waveguide portion R2 includes mesa waveguides M11, M12, M13, M14, M15, M16, M17, and M18 (second mesa waveguides). Each of mesa waveguides M11 to M18 has the same shape as mesa waveguide M1. The input terminals of mesa waveguides M11 to M18 are connected to the output terminals of mesa waveguides M1 to M8, respectively.

Optical modulation portion R3 includes mesa waveguides M21, M22, M23, M24, M25, M26, M27, and M28. Each of mesa waveguides M21 to M28 has the same configuration as mesa waveguide M1. Input terminals of mesa waveguides M21 to M28 are connected to output terminals of mesa waveguides M11 to M18, respectively. Optical modulation portion R3 includes electrodes E11, E12, E13, E14, E15, E16, E17, and E18. Electrodes E11 to E18 are connected to mesa waveguides M21 to M28, respectively. A wiring is connected to each of electrodes E11 to E18.

Optical waveguide portion R4 includes optical multiplexers C4a, C4b, C4c, C4d and phase shift portions PS1, PS2. Each optical multiplexer is a multi-mode interference coupler such as a 2×1 multi-mode interference coupler. A first input terminal and a second input terminal of optical multiplexer C4a are respectively connected to output terminals of mesa waveguides M21 and M22 by mesa waveguides. A first input terminal and a second input terminal of optical multiplexer C4b are respectively connected to output terminals of mesa waveguides M23 and M24 by mesa waveguides. A first input terminal and a second input terminal of optical multiplexer C4c are respectively connected to output terminals of mesa waveguides M25 and M26 by mesa waveguides. A first input terminal and a second input terminal of optical multiplexer C4d are respectively connected to output terminals of mesa waveguides M27 and M28 by mesa waveguides. An output terminal of optical multiplexer C4b is connected to an input terminal of phase shift portion PS1. An output terminal of optical multiplexer C4d is connected to an input terminal of phase shift portion PS2. Each of phase shift portions PS1 and PS2 can shift phase of propagating light by, for example, π/2.

Optical modulation portion R5 includes mesa waveguides M31, M32, M33, and M34. Each of mesa waveguides M31 to M34 has the same configuration as mesa waveguide M1. An input terminal of mesa waveguide M31 is connected to an output terminal of optical multiplexer C4a by a mesa waveguide. An input terminal of mesa waveguide M32 is connected to an output terminal of phase shift portion PS1 by a mesa waveguide. An input terminal of mesa waveguide M33 is connected to an output terminal of optical multiplexer C4c by a mesa waveguide. An input terminal of mesa waveguide M34 is connected to an output terminal of phase shift portion PS2 by a mesa waveguide. Optical modulation portion R5 includes electrodes E21, E22, E23, and E24. Electrodes E21 to E24 are respectively connected to mesa waveguides M31 to M34. A wiring is connected to each of electrodes E21 to E24.

Optical waveguide portion R6 includes, for example, multi-mode interference couplers C5a and C5b each of which is a 2×2 multi-mode interference coupler. A first input terminal and a second input terminal of multi-mode interference coupler C5a are respectively connected to output terminals of mesa waveguides M31 and M32 by mesa waveguides. A first output terminal and a second output terminal of multi-mode interference coupler C5a are respectively connected to output ports P2 and P3 by mesa waveguides. A first input terminal and a second input terminal of multi-mode interference coupler C5b are respectively connected to output terminals of mesa waveguides M33 and M34 by mesa waveguides. A first output terminal and a second output terminal of multi-mode interference coupler C5b are respectively connected to output ports P4 and P5 by mesa waveguides. Output ports P2 to P5 are located at an edge of substrate 12.

As shown in FIGS. 2 and 4, each of mesa waveguides M1 and M2 of optical modulation portion R1 is provided on substrate 12, extends along the Y-axis direction, and has a height in the Z-axis direction. Mesa waveguides M1 and M2 are separated from each other in the X-axis direction. Each of mesa waveguides M1 and M2 includes a p-type semiconductor layer 16 provided on or above substrate 12, a first core layer 18 provided on p-type semiconductor layer 16, and an n-type semiconductor layer 20 provided on first core layer 18. A p-type semiconductor layer 14 may be provided between substrate 12 and p-type semiconductor layer 16. An n-type semiconductor layer 22 may be provided on n-type semiconductor layer 20.

P-type semiconductor layer 16 may function as a lower cladding layer. N-type semiconductor layer 20 may function as an upper cladding layer. First core layers 18 of mesa waveguides M1 and M2 are arranged to be separated from each other in the X-axis direction. In a cross section of mesa waveguide M1 orthogonal to the Y-axis direction, a spot S1 of light is formed over p-type semiconductor layer 16, first core layer 18, and n-type semiconductor layer 20. In a cross section of mesa waveguide M2 orthogonal to the Y-axis direction, a spot S2 of light is formed over p-type semiconductor layer 16, first core layer 18, and n-type semiconductor layer 20.

Electrode E1 is connected to n-type semiconductor layer 22 of mesa waveguide M1. Electrode E1 is in ohmic contact with n-type semiconductor layer 22 of mesa waveguide M1. Similarly, electrode E2 is connected to n-type semiconductor layer 22 of mesa waveguide M2. Electrode E2 is in ohmic contact with n-type semiconductor layer 22 of mesa waveguide M2. N-type semiconductor layer 22 may function as an n-type contact layer. A differential signal is supplied to electrodes E1 and E2. For example, an electrode that provides a ground potential may be connected to p-type semiconductor layer 14. P-type semiconductor layer 14 can function as a p-type contact layer.

An insulating film 30 containing, for example, an inorganic material may be provided on main surface 12a of substrate 12 and the side surfaces of mesa waveguides M1 and M2. An embedded region 32 may be provided on insulating film 30 so as to embed mesa waveguides M1 and M2. Embedded region 32 includes, for example, a resin. Insulating film 30 may be provided on embedded region 32.

Substrate 12 is, for example, a semi-insulating semiconductor substrate. Substrate 12 includes a group III-V compound semiconductor doped with an insulating dopant. Substrate 12 includes, for example, InP doped with iron (Fe). A dopant concentration of substrate 12 may be from $1\times10^{17}$ $cm^{-3}$ to $1\times10^{18}$ $cm^{-3}$.

As shown in FIG. 2, p-type semiconductor layer 14 includes a first portion 14a located between first core layer 18 and substrate 12 and a pair of second portions 14b located on both sides of first portion 14a. First portion 14a and the pair of second portions 14b extend in the Y-axis direction. Therefore, a width (length in the X-axis direction) of p-type semiconductor layer 14 is larger than a width of first core layer 18. P-type semiconductor layer 14 of mesa waveguide M1 and p-type semiconductor layer 14 of mesa waveguide M2 are connected to each other. In this embodiment, p-type semiconductor layer 14 of mesa waveguide M1 and p-type semiconductor layer 14 of mesa waveguide M2 are connected to each other to form a single semiconductor layer. P-type semiconductor layer 14 may not include the pair of second portions 14b. In this case, p-type semiconductor layer 14 of mesa waveguide M1 and p-type semiconductor layer 14 of mesa waveguide M2 can be electrically connected to each other by a semiconductor layer or a conductive layer provided between substrate 12 and p-type semiconductor layer 14.

P-type semiconductor layer 14 includes a group III-V compound semiconductor doped with a p-type dopant. P-type semiconductor layer 14 includes, for example, InGaAs or InP doped with zinc (Zn). P-type semiconductor layer 14 has a dopant concentration that is greater than a dopant concentration of p-type semiconductor layer 16. The dopant concentration of p-type semiconductor layer 14 may be ten times or more compared with the dopant concentration of p-type semiconductor layer 16. The dopant concentration of p-type semiconductor layer 14 may be $5 \times 10^{18}$ $cm^{-3}$ or more, or $1 \times 10^{19}$ $cm^{-3}$ or more. P-type semiconductor layer 14 has a thickness T1 of, for example, 0.5 µm to 2.0 µm.

P-type semiconductor layer 16 includes a first portion 16a located between first core layer 18 and p-type semiconductor layer 14, and a pair of second portions 16b located on both sides of first portion 16a. A thickness of first portion 16a is greater than that of second portion 16b. First portion 16a and the pair of second portions 16b extend in the Y-axis direction. Therefore, a width of p-type semiconductor layer 16 is larger than that of first core layer 18. P-type semiconductor layer 16 of mesa waveguide M1 and p-type semiconductor layer 16 of mesa waveguide M2 are connected to each other. In this embodiment, p-type semiconductor layer 16 of mesa waveguide M1 and p-type semiconductor layer 16 of mesa waveguide M2 are connected to each other to form a single semiconductor layer. P-type semiconductor layer 16 may not include the pair of second portions 16b.

P-type semiconductor layer 16 includes a group III-V compound semiconductor doped with a p-type dopant. P-type semiconductor layer 16 may include a semiconductor material that is different from the semiconductor material of p-type semiconductor layer 14. P-type semiconductor layer 16 includes, for example, InP doped with Zn. The dopant concentration of p-type semiconductor layer 16 may be from $1 \times 10^{17}$ $cm^{-3}$ to $2 \times 10^{18}$ $cm^{-3}$. A thickness T2 (the thickness of first portion 16a) of p-type semiconductor layer 16 may be larger than the thickness T1 of p-type semiconductor layer 14, and may be from 1.0 µm to 3.0 µm, for example.

First core layer 18 is an i-type semiconductor layer, that is, an undoped semiconductor layer. First core layer 18 may have a multiple quantum well structure. First core layer 18 includes, for example, an AlGaInAs-based group III-V compound semiconductor. The width of first core layer 18 is, for example, 1.5 µm or less.

N-type semiconductor layer 20 includes a group III-V compound semiconductor doped with an n-type dopant. N-type semiconductor layer 20 includes, for example, InP doped with S1. A dopant concentration of n-type semiconductor layer 20 may be from $1 \times 10^{17}$ $cm^{-3}$ to $2 \times 10^{18}$ $cm^{-3}$. A thickness of n-type semiconductor layer 20 is, for example, from 1.0 µm to 3.0 µm.

N-type semiconductor layer 22 includes a group III-V compound semiconductor doped with an n-type dopant. N-type semiconductor layer 22 may include a semiconductor material that is different from the semiconductor material of n-type semiconductor layer 20. N-type semiconductor layer 22 includes, for example, InGaAs or InP doped with S1. N-type semiconductor layer 22 has a dopant concentration that is greater than that of n-type semiconductor layer 20. The dopant concentration of n-type semiconductor layer 22 may be $1 \times 10^{18}$ $cm^{-3}$ or more, or $1 \times 10^{19}$ $cm^{-3}$ or more. A thickness of n-type semiconductor layer 22 is, for example, from 0.1 µm to 0.5 µm.

As shown in FIGS. 3 and 4, each of mesa waveguides M11 and M12 of optical waveguide portion R2 includes a first cladding layer 116 provided on or above substrate 12, a second core layer 118 provided on first cladding layer 116, and a second cladding layer 120 provided on second core layer 118. P-type semiconductor layer 14 may be provided between substrate 12 and first cladding layer 116. An n-type semiconductor layer 122 may be provided on second cladding layer 120. No electrode is connected to n-type semiconductor layer 122.

Second core layer 118 is optically coupled to first core layer 18. Second core layer 118 may include the same material as that of first core layer 18. A conductivity type of second core layer 118 may be i-type. Second core layer 118 may further include protons. A proton concentration of second core layer 118 may be $5 \times 10^{18}$ $cm^{-3}$ or less.

First cladding layer 116 may have the same configuration (material and shape) as p-type semiconductor layer 16 except that first cladding layer 116 further includes protons. A conductivity type of first cladding layer 116 may be i-type. First cladding layer 116 includes a first portion 116a located between second core layer 118 and p-type semiconductor layer 14, and a pair of second portions 116b located on both sides of first portion 116a. A p-type dopant concentration of first cladding layer 116 may be from $1 \times 10^{17}$ $cm^{-3}$ to $2 \times 10^{18}$ $cm^{-3}$. The proton concentration of first cladding layer 116 may be from $1 \times 10^{18}$ $cm^{-3}$ to $5 \times 10^{19}$ $cm^{-3}$.

First cladding layer 116 may have a higher maximum proton concentration than the maximum p-type dopant concentration of first cladding layer 116. The maximum value of the proton concentration in first cladding layer 116 may be three times or more than the maximum value of the p-type dopant concentration in first cladding layer 116. First cladding layer 116 may have the maximum proton concentration that is higher than a maximum proton concentration of second core layer 118. First cladding layer 116 may have a maximum proton concentration that is higher than that of second cladding layer 120. A profile of the proton concentration in a stacking direction (Z-axis direction) of first cladding layer 116, second core layer 118, and second cladding layer 120 may have a peak (maximum value) in first cladding layer 116. In the Z-axis direction, the position of the peak is separated from a boundary between first cladding layer 116 and second core layer 118 by, for example, 0.1 µm or more. In the Z-axis direction, the position of the peak may be located within a region having a distance of 0.1 µm or less from the center of first cladding layer 116. The profile of the proton concentration may monotonically increase from second cladding layer 120 toward the peak in first cladding layer 116 in the Z-axis direction.

Second cladding layer 120 may have the same configuration (material and shape) as n-type semiconductor layer 20. A conductivity type of second cladding layer 120 may be n-type. Second cladding layer 120 may further include protons. An n-type dopant concentration of second cladding layer 120 may be from $1 \times 10^{17}$ $cm^{-3}$ to $2 \times 10^{18}$ $cm^{-3}$. The proton concentration of second cladding layer 120 may be $5 \times 10^{18}$ $cm^{-3}$ or less.

N-type semiconductor layer 122 may have the same configuration (material and shape) as n-type semiconductor layer 22. N-type semiconductor layer 122 may further include protons. The proton concentration of n-type semiconductor layer 122 may be $5\times10^{18}$ cm$^{-3}$ or less.

As shown in FIG. 4, each of mesa waveguides M1 and M2 of optical modulation portion R1 may include a semi-insulating semiconductor layer 26 provided on first core layer 18 and a semi-insulating semiconductor layer 28 provided on semi-insulating semiconductor layer 26. N-type semiconductor layer 20, semi-insulating semiconductor layer 26, and second cladding layer 120 are sequentially arranged in the Y-axis direction. N-type semiconductor layer 22, semi-insulating semiconductor layer 28, and n-type semiconductor layer 122 are sequentially arranged in the Y-axis direction. No electrode is connected to semi-insulating semiconductor layer 28.

Semi-insulating semiconductor layer 26 includes a group III-V compound semiconductor doped with an insulating dopant. Semi-insulating semiconductor layer 26 includes, for example, InP doped with Fe. Semi-insulating semiconductor layer 28 includes a group III-V compound semiconductor doped with an insulating dopant. Semi-insulating semiconductor layer 28 includes, for example, InGaAsP doped with Fe.

According to optical modulator 10 of this embodiment, a carrier trap level is generated by a defect generated in first cladding layer 116 by proton implantation. As a result, free carrier absorption or intersubband absorption in first cladding layer 116 is reduced, so that absorption of light by first cladding layer 116 can be suppressed. Therefore, in optical waveguide portion R2, the propagation loss of light propagating through second core layer 118 can be reduced.

Further, since the p-type dopant is trapped in the defect generated in first cladding layer 116 by the proton implantation, a thermal diffusion of the p-type dopant in first cladding layer 116 toward second core layer 118 can be suppressed. Therefore, deterioration of a device characteristics of optical modulator 10 can be suppressed.

When first cladding layer 116 has the maximum proton concentration higher than the maximum p-type dopant concentration of first cladding layer 116, the absorption of light by first cladding layer 116 can be further suppressed. The conductivity type of first cladding layer 116 turns to be i-type.

When first cladding layer 116 has a maximum value of proton concentration higher than a maximum value of proton concentration in second core layer 118, the proton concentration of second core layer 118 can be reduced. Therefore, since the conductivity type of second core layer 118 can be prevented from becoming an n-type, the propagation loss of light in second core layer 118 can be reduced.

When first cladding layer 116 has a proton concentration maximum value higher than the proton concentration maximum value of second cladding layer 120, the proton concentration of second cladding layer 120 can be reduced. Therefore, the conductivity type of second cladding layer 120 can be prevented from becoming i-type.

The conductivity type of first cladding layer 116, second core layer 118, and second cladding layer 120 can be measured, for example, by scanning capacitance microscopy (SCM).

Hereinafter, various experiments performed for evaluating optical modulator 10 will be described. The experiments described below do not limit the present disclosure.

(First Experiment)

The optical modulator of the first experiment has the same configuration as optical modulation portion R1 and optical waveguide portion R2 shown in FIGS. 2 to 4. Specifically, the optical modulator of the first experiment has the following structure.

Substrate 12: InP substrate doped with Fe (Fe concentration: from $1\times10^{17}$ cm$^{-3}$ to $1\times10^{18}$ cm$^{-3}$);

P-type semiconductor layer 14: p-InGaAs contact layer. InGaAs layer doped with Zn (Zn concentration: $2\times10^{19}$ cm$^{-3}$);

P-type semiconductor layer 16: p-InP lower cladding layer. InP layer doped with Zn (Zn concentration: $2\times10^{17}$ cm$^{-3}$);

First cladding layer 116: i-InP lower cladding layer. InP layer doped with Zn and ion-implanted with protons;

First core layer 18 and second core layer 118: i-core layer. AlGaInAs/AlInAs multiple quantum well;

N-type semiconductor layer 20 and second cladding layer 120: Si-doped n-InP layer (Si-concentration $2\times10^{17}$ cm$^{-3}$);

N-type semiconductor layer 22 and n-type semiconductor layer 122: Si-doped n-InGaAs layer (Si-concentration $1\times10^{18}$ cm$^{-3}$).

Figure 5:
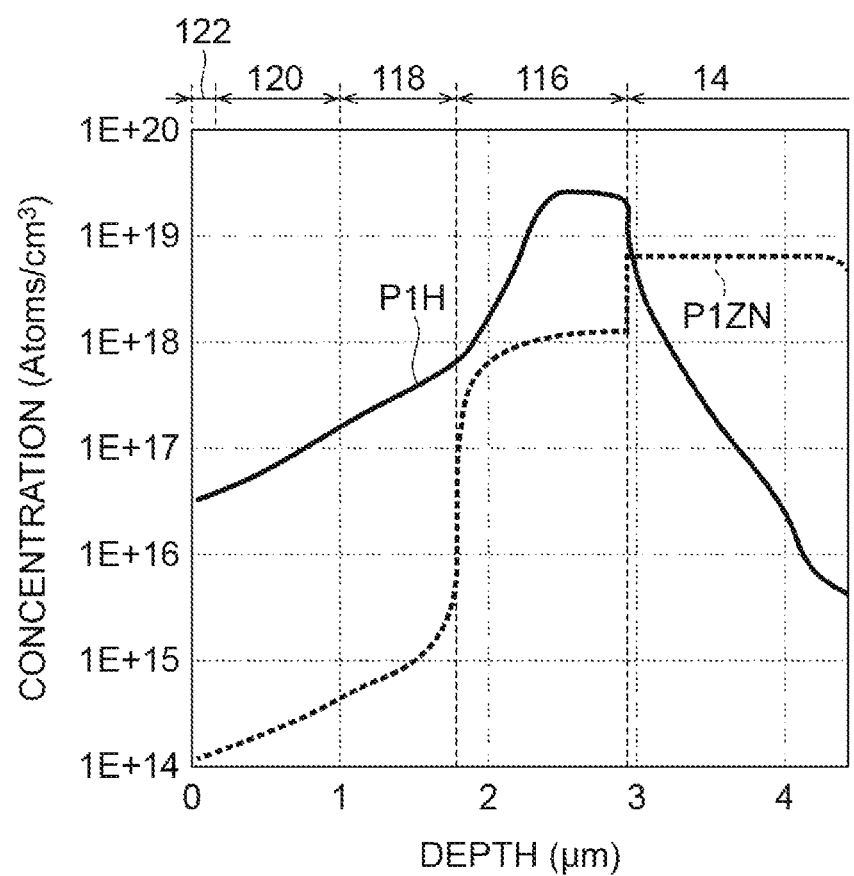
FIG. 5 is a graph illustrating a relationship between a proton concentration or a p-type dopant concentration and a depth before a heat treatment after an ion implantation.

First cladding layer 116 is obtained by a heat treatment of p-type semiconductor layer 16 after ion implantation of protons into p-type semiconductor layer 16. The heat treatment is performed at 396° C. for 90 minutes. Secondary Ion Mass Spectrometry (SIMS) measurement was performed after the ion implantation and before the heat treatment. The results are shown in FIG. 5. After the heat treatment, SIMS measurement was performed. The results are shown in FIG. 6.

FIG. 5 is a graph illustrating the relationship between the proton concentration or p-type dopant concentration and depth before the heat treatment after the ion implantation. FIG. 6 is a graph illustrating the relationship between proton concentration or p-type dopant concentration and depth after the heat treatment. In each graph, the vertical axis represents the proton concentration or the p-type dopant concentration. The p-type dopant concentration is the Zn concentration. In each graph, the horizontal axis indicates the position (depth) in optical waveguide portion R2 in the Z-axis direction of FIG. 4. The position where the depth becomes 0 is the position of the upper surface of n-type semiconductor layer 122. In the graph of FIG. 5, a profile P1ZN of the Zn concentration and a profile P1H of the proton concentration are shown. In the graph of FIG. 6, a profile P2ZN corresponds to the Zn concentration and a profile P2H corresponds to the proton concentration.

Figure 6:
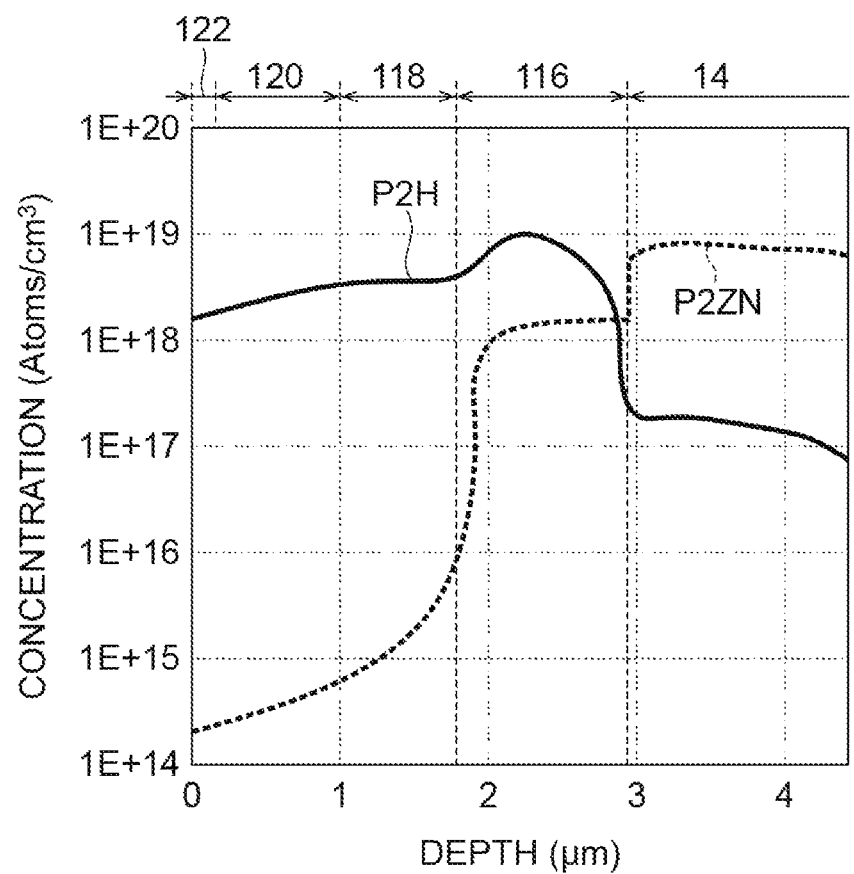
FIG. 6 is a graph illustrating a relationship between a proton concentration or a p-type dopant concentration and the depth after the heat treatment.

From the graphs of FIGS. 5 and 6, it can be seen that the maximum value of the proton concentration in first cladding layer 116 is reduced by the heat treatment. This is because protons in first cladding layer 116 are diffused toward second core layer 118 and second cladding layer 120 by the heat treatment. Further, the following can be seen from the graph of FIG. 6. The maximum value of the proton concentration of first cladding layer 116 is higher than the maximum p-type dopant concentration of first cladding layer 116. The maximum value of the proton concentration of first cladding layer 116 is higher than the maximum value of the proton concentration of second core layer 118, and higher than the maximum value of the proton concentration of second cladding layer 120.

(Second Experiment)

A first mesa waveguide structure in which the following layers were sequentially formed on an InP substrate doped with Fe was prepared.

n-InP lower cladding layer doped with Si;
i-core layer (AlGaInAs/AlInAs multiple quantum well, width of the mesa waveguide 1.8 μm);
i-InP upper cladding layer doped with Zn and ion-implanted with protons;
Zn-doped p-InGaAs layer.

A second mesa waveguide structure having the same structure as the first mesa waveguide structure except that protons were not ion-implanted into the InP upper cladding layer was prepared. The second mesa waveguide structure includes the p-InP upper cladding layer doped with Zn. Therefore, the second mesa waveguide structure has a so-called pin structure.

For the first mesa waveguide structure and the second mesa waveguide structure, propagation losses of light having wavelengths in 1550 nm were calculated. The propagation loss in the first mesa waveguide structure was lower than that in the second mesa waveguide structure by about 0.18 dB/mm. This shows that the propagation loss of light in the core layer can be reduced by ion-implanting protons into the p-InP upper cladding layer. Therefore, in a mesa waveguide structure having a so-called nip structure, it is considered that the propagation loss of light in the core layer can be reduced by ion-implanting protons into the p-InP lower cladding layer.

Hereinafter, a method of manufacturing an optical modulator according to an embodiment will be described with reference to FIGS. 7 to 10. Optical modulator 10 can be manufactured as follows.

(Forming a Semiconductor Stack)

Figure 7:
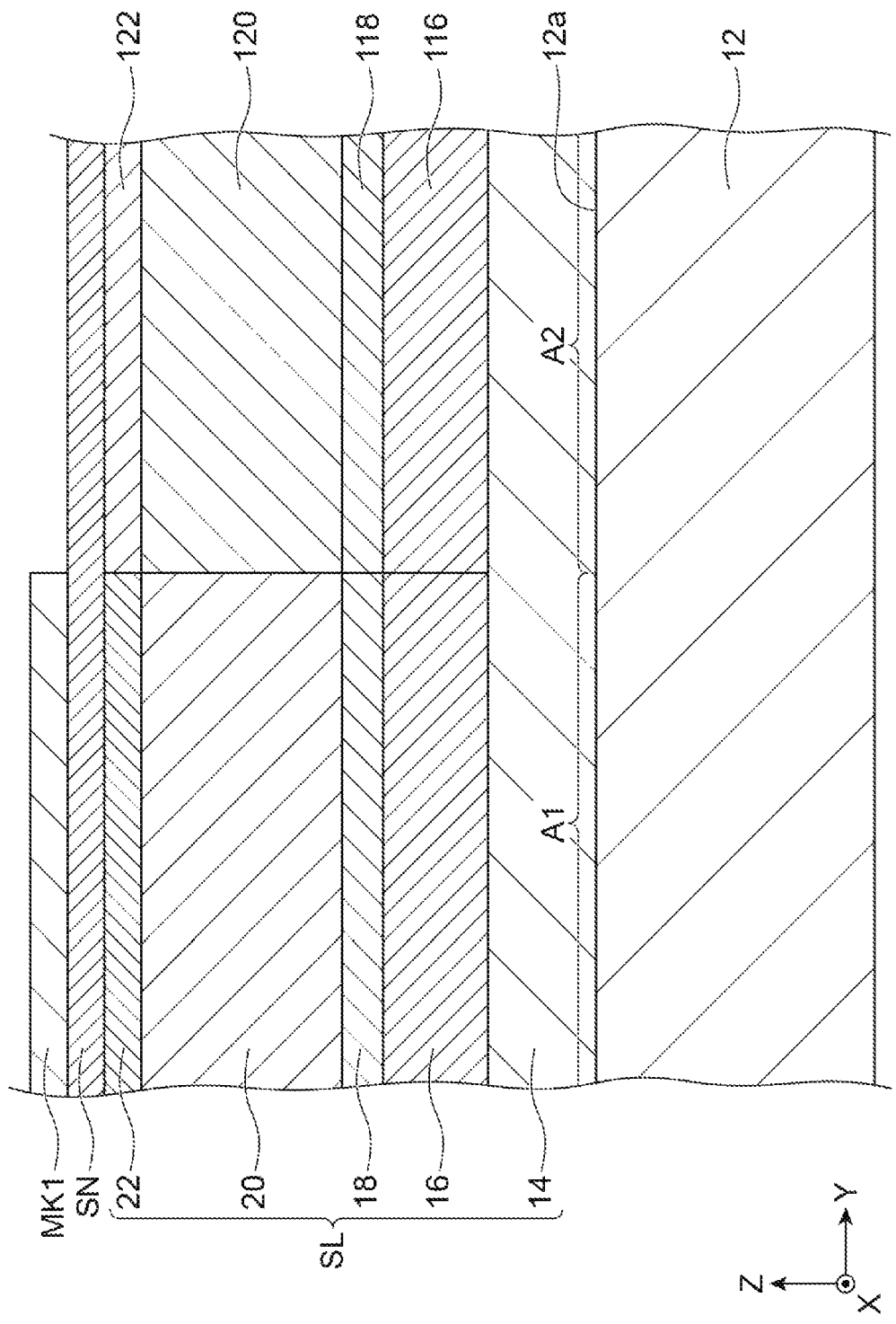
FIG. 7 is a cross-sectional view schematically illustrating one step of a method for manufacturing an optical modulator according to an embodiment.

First, as shown in FIG. 7, a semiconductor stack SL is formed on substrate 12. Semiconductor stack SL includes p-type semiconductor layer 16 provided on or above substrate 12, first core layer 18 provided on p-type semiconductor layer 16, and n-type semiconductor layer 20 provided on first core layer 18. Semiconductor stack SL may include p-type semiconductor layer 14 disposed between substrate 12 and p-type semiconductor layer 16. Semiconductor stack SL may include n-type semiconductor layer 22 provided on n-type semiconductor layer 20. Each layer is formed by, for example, an organometallic vapor phase epitaxy (OMVPE) method.

(Ion Implantation)

Next, as shown in FIG. 7, an insulating film SN is formed on semiconductor stack SL, and then a mask MK1 is formed on insulating film SN. Insulating film SN is, for example, a silicon nitride film. Mask MK1 is, for example, a resist mask. A thickness of mask MK1 is, for example, 5 μm or more. Mask MK1 has openings above seventh area A7, second area A2, fourth area A4, and sixth area A6 on main surface 12a of substrate 12. That is, first area A1, third area A3, and fifth area A5 are covered by mask MK1. The openings of mask MK1 can be formed by, for example, photolithography and etching.

Next, protons are implanted into semiconductor stack SL by ion implantation. The ion implantation may be performed such that the profile of the proton concentration in the depth direction (stacking direction of semiconductor stack SL) has a peak in p-type semiconductor layer 16. The profile of the proton concentration in the depth direction can be controlled by the energy and dose during the ion implantation. By the ion implantation, protons are implanted into portions of p-type semiconductor layer 16 located above seventh area A7, second area A2, fourth area A4, and sixth area A6. As a result, the conductivity type of the portions changes from p-type to n-type. Protons are also implanted into portions of first core layer 18 located above seventh area A7, second area A2, fourth area A4, and sixth area A6. The conductivity type of the portions remains i-type. Protons are also implanted into portions of n-type semiconductor layer 20 and n-type semiconductor layer 22 located above seventh area A7, second area A2, fourth area A4, and sixth area A6. The conductivity type of the portions changes from n-type to i-type.

(Heat Treatment)

Next, semiconductor stack SL is heat-treated. The temperature of the heat treatment may be from 300° C. to 500° C. The time of the heat treatment may be from 60 minutes to 120 minutes. As a result, the conductivity type of the portions of p-type semiconductor layer 16 located above seventh area A7, second area A2, fourth area A4, and sixth area A6 changes from n-type to i-type. As a result, first cladding layer 116 is formed. The portions of first core layer 18 located above seventh area A7, second area A2, fourth area A4, and sixth area A6 remain i-type. As a result, second core layer 118 is formed. The conductivity type of the portions of n-type semiconductor layer 20 and n-type semiconductor layer 22 located above seventh area A7, second area A2, fourth area A4, and sixth area A6 returns from i-type to n-type. As a result, second cladding layer 120 and n-type semiconductor layer 122 are formed. After that, mask MK1 and insulating film SN are removed.

(Formation of Semi-Insulating Semiconductor Layer)

Figure 8:
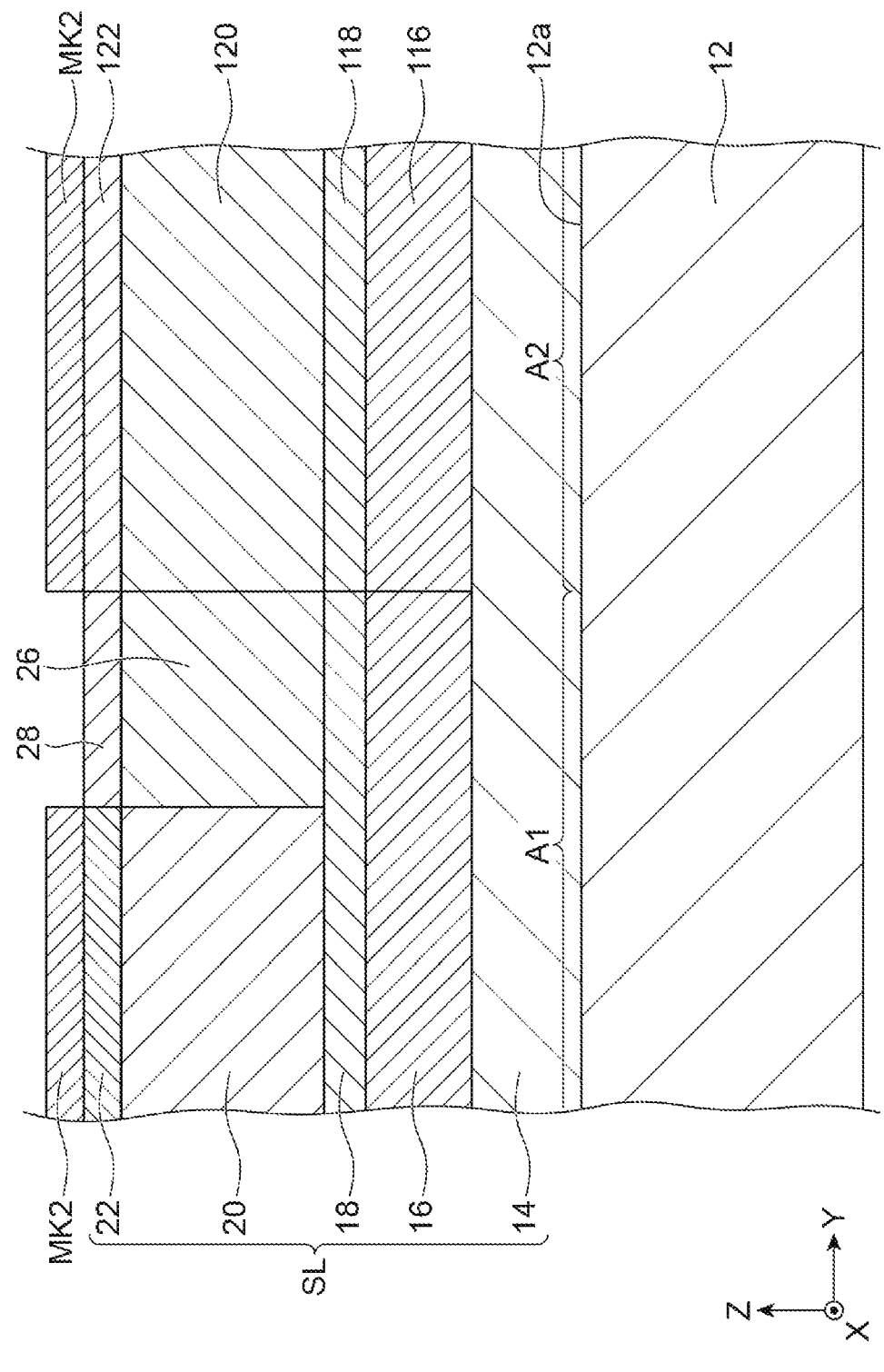
FIG. 8 is a cross-sectional view schematically illustrating one step of the method for manufacturing the optical modulator according to the embodiment.

Next, as shown in FIG. 8, a mask MK2 is formed on semiconductor stack SL. Mask MK2 has an opening on a part of first area A1. N-type semiconductor layer 20 and n-type semiconductor layer 22 are wet-etched using mask MK2. Semi-insulating semiconductor layer 26 and semi-insulating semiconductor layer 28 are sequentially formed in a recess formed by wet etching. Each layer is formed by, for example, OMVPE method using mask MK2. Thereafter, mask MK2 is removed.

(Forming Mesa Waveguide)

Figure 9:
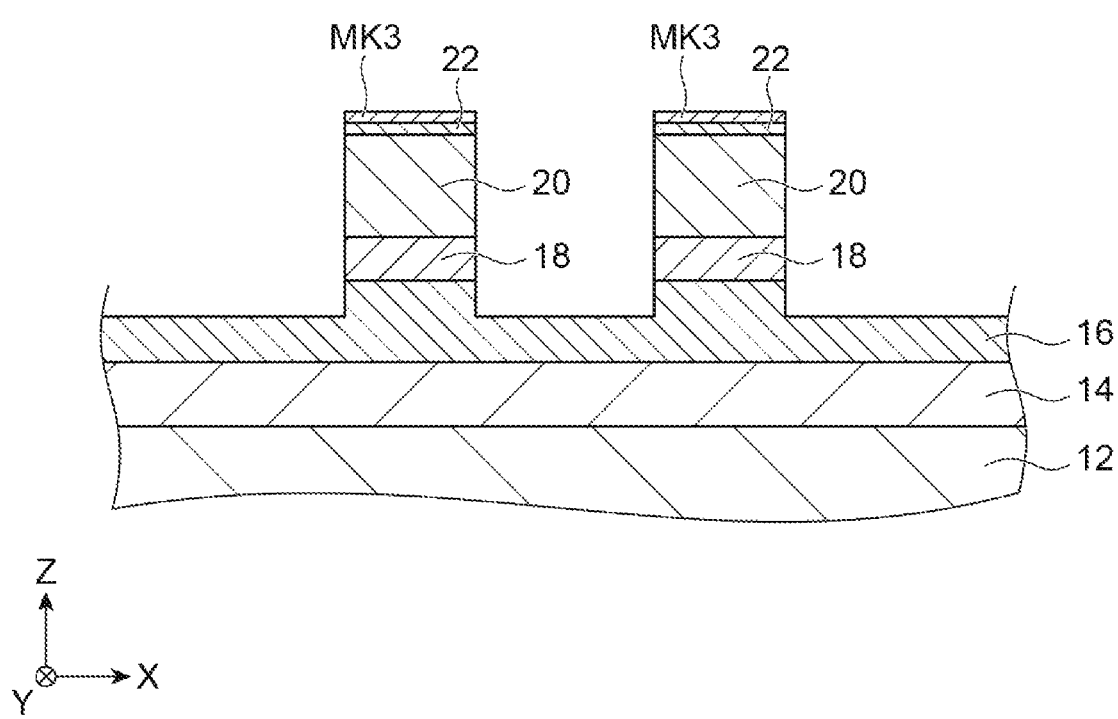
FIG. 9 is a cross-sectional view schematically illustrating one step of the method for manufacturing the optical modulator according to the embodiment.

Next, as shown in FIG. 9, a mask MK3 is formed on n-type semiconductor layer 22. Mask MK3 extends in the Y-axis direction. N-type semiconductor layer 22, n-type semiconductor layer 20, first core layer 18, and p-type semiconductor layer 16 are etched using Mask MK3. Mask MK3 is also formed on n-type semiconductor layer 122. N-type semiconductor layer 122, second cladding layer 120, second core layer 118, and first cladding layer 116 are etched using Mask MK3. Thereafter, mask MK3 is removed.

Figure 10:
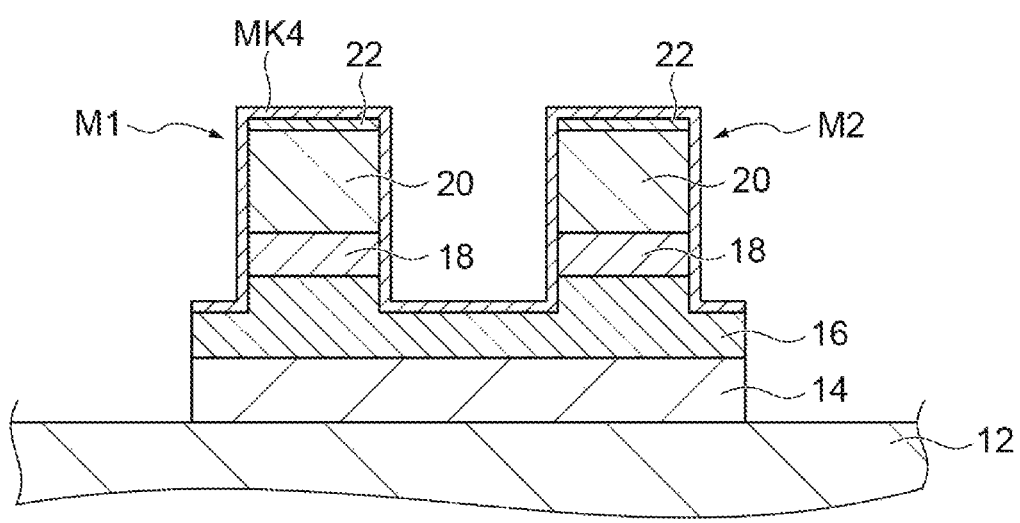
FIG. 10 is a cross-sectional view schematically illustrating one step of the method for manufacturing the optical modulator according to the embodiment.

Next, as shown in FIG. 10, a mask MK4 is formed on n-type semiconductor layer 22. Mask MK4 extends in the Y-axis direction. P-type semiconductor layer 16 and p-type semiconductor layer 14 are etched using mask MK4. From these processes, mesa waveguides M1 to M8 in optical modulation portion R1 are formed. Mask MK4 is also formed on n-type semiconductor layer 122. First cladding layer 116 and p-type semiconductor layer 14 are etched using mask MK4 (see FIG. 3). Mesa waveguides M11 to M18 in optical waveguide portion R2 are formed. At the same time, mesa waveguides M21 to M28 and M31 to M34 shown in FIG. 1 and other mesa waveguides are formed.

Next, insulating film 30 shown in FIGS. 2 and 3 is formed so as to cover mesa waveguides M1, M2, M11, and M12. Insulating film 30 is formed so as to cover other mesa waveguides. Then, resin is coated on insulating film 30 to form embedded region 32. Thereafter, insulating film 30 is formed on embedded region 32.

(Forming Electrode and Wiring)

Next, as shown in FIGS. 2 and 4, electrode E1 and electrode E2 are formed on mesa waveguides M1 and M2, respectively. At the same time, electrodes E11 to E18 and electrodes E21 to E24 shown in FIG. 1 are formed. Next, wiring E1a and wiring E2a connected to electrode E1 and electrode E2 are formed, respectively. At the same time, the wiring connected to each of electrodes E11 to E18 and electrodes E21 to E24 is also formed, respectively.

Although the preferred embodiments of the present disclosure have been described in detail above, the present disclosure is not limited to the above embodiments. The constituent elements of the embodiments may be arbitrarily combined.

It should be understood that the embodiments disclosed herein are illustrative and non-restrictive in every respect. The scope of the present invention is defined by the claims rather than the meaning described above, and is intended to include all modifications within the meaning and scope equivalent to the claims.

What is claimed is:

1. An optical modulator comprising:
   a substrate having a main surface including a first area and a second area;
   an optical modulation portion disposed on the first area; and
   an optical waveguide portion disposed on the second area,
   wherein the optical modulation portion includes a first mesa waveguide and an electrode connected to the first mesa waveguide,
   wherein the first mesa waveguide includes a p-type semiconductor layer disposed on or above the substrate, a first core layer disposed on the p-type semiconductor layer, and an n-type semiconductor layer disposed on the first core layer,
   wherein the optical waveguide portion includes a second mesa waveguide,
   wherein the second mesa waveguide includes a first cladding layer disposed on or above the substrate, a second core layer disposed on the first cladding layer, and a second cladding layer disposed on the second core layer,
   wherein the second core layer is optically coupled to the first core layer,
   wherein the first cladding layer contains a p-type dopant and protons, and
   wherein the second cladding layer contains an n-type dopant.

2. The optical modulator according to claim 1, wherein the first cladding layer has a maximum proton concentration higher than a maximum p-type dopant concentration of the first cladding layer.

3. The optical modulator according to claim 2, wherein the maximum proton concentration in the first cladding layer is three times or more than the maximum p-type dopant concentration in the first cladding layer.

4. The optical modulator according to claim 1, wherein the first cladding layer has a maximum proton concentration higher than a maximum proton concentration of the second core layer.

5. The optical modulator according to claim 1, wherein the first cladding layer has a maximum proton concentration higher than a maximum proton concentration of the second cladding layer.

6. The optical modulator according to claim 1, wherein a proton concentration of the first cladding layer is in a range from $1 \times 10^{18}$ cm$^{-3}$ to $5 \times 10^{19}$ cm$^{-3}$.

7. The optical modulator according to claim 1, wherein a profile of a proton concentration in a stacking direction of the first cladding layer, the second core layer, and the second cladding layer has a peak in the first cladding layer.

8. The optical modulator according to claim 7, wherein a position of the peak is separated from a boundary between the first cladding layer and the second core layer by 0.1 μm or more.

9. The optical modulator according to claim 7, wherein, in the stacking direction, a position of the peak is located within a region having a distance of 0.1 μm or less from a center of the first cladding layer.

10. The optical modulator according to claim 1, wherein a profile of a proton concentration in a stacking direction of the second cladding layer, the second core layer, and the first cladding layer monotonically increases from the second cladding layer toward a peak in the first cladding layer in the stacking direction.

11. The optical modulator according to claim 1, wherein a proton concentration of the second core layer is $5 \times 10^{18}$ cm$^{-3}$ or less.

12. The optical modulator according to claim 1, wherein a proton concentration of the second cladding layer is $5 \times 10^{18}$ cm$^{-3}$ or less.

13. The optical modulator according to claim 1, wherein the first mesa waveguide is an arm waveguide of a Mach-Zehnder modulator.

* * * * *